Patented Jan. 3, 1950

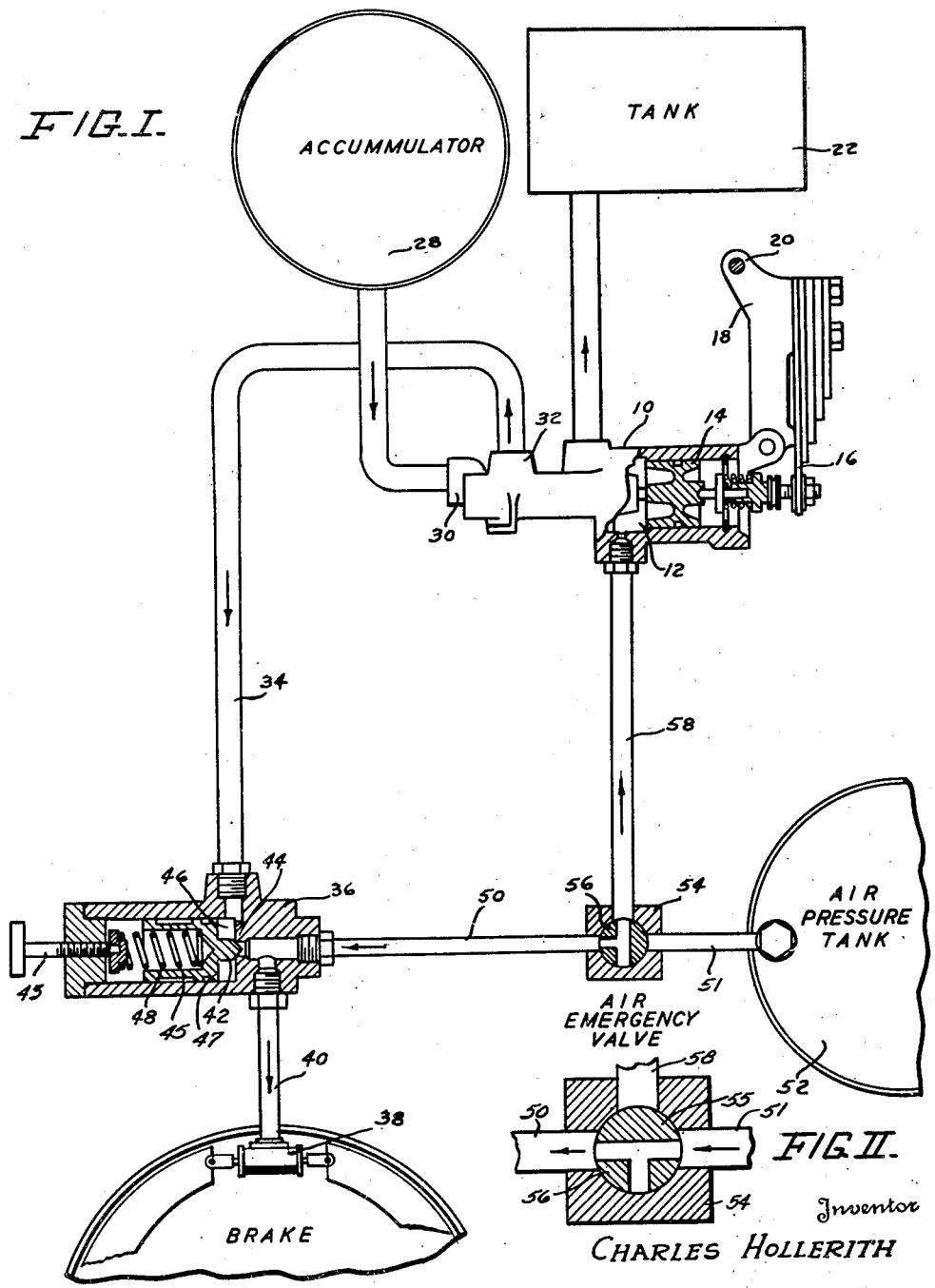

2,493,196

UNITED STATES PATENT OFFICE 2,493,196

LIQUID PRESSURE BRAKE SYSTEM WITH EMERGENCY AIR PRESSURE OPERATOR

Charles Hollerith, Jackson, Mich., assignor, by mesne assignments, to The B. F. Goodrich Company, Akron, Ohio, a corporation of New York Application April 22, 1946, Serial No. 663,990

3 Claims. (Cl. 188—152)

The present invention relates to improvements in brake systems, being especially adapted to aircraft brakes.

One of the objects of the invention is to provide a brake system in which an emergency air line is employed to transmit the "feel" of brake application to the operator, either to the brake valve or other reaction chamber.

Another object is to provide a brake system for power brakes in which the emergency air line is connected into the hydraulic brake system at a point directly adjacent the brake and is also employed as part of the conduit for transmitting the pressure developed at the brake back to the brake valve or other reaction chamber so that the "feel" at the operator's pedal is actual and timed with the brake operation.

A further object is to provide an improved hydraulic brake system for aircraft and the like, in which the brakes are remotely located from the operator and the brake "feel" is conducted from a point directly adjacent the brake to the reaction chamber through a conduit separate from the conduit through which the hydraulic pressure is carried to the brakes for the brake application.

A still further object is to provide an improved hydraulic brake system in which the "feel" chamber and the emergency air tank have a common connection with the brake, which is connected into the hydraulic system at a point directly adjacent the brake, there being a two-way valve to selectively connect said chamber and tank with a said common connection.

These and other objects residing in the combination of the parts and their specific relation to one another as well as their instruction will more fully appear from a consideration of the following specification and claims with reference to the drawings in which Figure I is a diagrammatic layout of a brake system embodying the present invention, it being understood that the brake is not shown in a normal relationship to the other elements of the system and Figure II is a detail view showing the air emergency valve adjusted to operative position in which the pressure air is conducted to the brake.

Referring to the drawings a brake actuator pressure supply system is shown comprising a brake valve 10, which in itself forms no part of the present invention and is fully disclosed in the co-pending application, Serial No. 21,037, now Patent Number 2,476,054 Edwin F. Loweke, filed April 14, 1948, as a continuation of abandoned application, Serial No. 545,638, filed July 19, 1944. The brake valve 10, has incorporated therein as an integral part, a "feel" chamber 12, and a piston 14 actuated by a spring stack 16 carried by a lever 18 and adapted to be connected at 20 to a foot pedal or other manual actuator in a well-known manner. Upon actuation of the piston to move it to the left as seen in Fig. I, hydraulic fluid is admitted into the brake valve at 30 from the accumulator 28 and is allowed to flow out through the outlet connection 32. The conduit 34 connects the outlet connection 32 with the brake clearance adjustment and reverse flow control valve 36 which is preferably located directly adjacent the brake 38 and connected therewith through a short nipple 40 or other equivalent structure. It is to be understood that the length of the conduit 34 is grossly out of scale as is the length of the emergency air line to be hereafter described. This is especially true of aircraft installations in which the brakes are very remotely located from the cockpit. The valve 36 includes a piston 45 having a needle valve extension valve part 42 engageable with seat 44 to control the opening of the chamber 46 to the conduit 40. Tension of the spring 48 determines the clearance between the brake elements of the brake 38 in a well-known manner.

The emergency air line conduits 50 and 51 connect the brake 38 with the air pressure tank 52. Inserted between the conduits 50 and 51 is a two-way selector valve 54 having a manually rotatable valve part 56 for selectively placing the conduit 50 in communication with either the conduit 51 or the conduit 58, the latter extending to the "feel" chamber 12. Normally the valve part 56 is in the position shown in the Figure I with the "feel" chamber 12 in hydraulic fluid pressure communication with the brake 38. In the event of a failure of the regular hydraulic brake system, the valve 56 is manually adjusted to the position shown in Figure II to apply the brakes using as a source of operation the air pressure in the tank 52.

Referring to Figure I, it will be seen that the piston 45 of the hydraulic fluid control valve 36 presents an annular face 47 to the chamber 46 and that the piston needle valve part 42 presents a relatively small end surface to the flow aperture defined by the seat 44. In the normal operation of the brake system, utilizing the hydraulic pressure fluid to actuate the brake 38 and with the two-way valve 56 positioned as shown in Figure I, the hydraulic pressure fluid is delivered, under the control of the brake valve 10, through the pipe 34 to the chamber 46 where, due to the relatively large area of the piston surface 47, the piston 45 is forced back to the left, compressing the spring 48 and permitting the hydraulic pressure fluid to flow through the pipe 40 to the brake.

With the parts so positioned, in the event that the hydraulic fluid pressure flow system fails, the spring 48 operates to move the piston 45 to the right to seat the needle valve extension against the seat 44 and thereby close-off the pipe 34 from the pipe 40. Now, assuming that the operator turns the emergency valve 56 to the position shown in Figure II, air pressure from the emergency air pressure tank 52 is allowed to flow along the pipe 50 to the pipe 40 to actuate the brake 38. In this adjusted condition of the parts, the pipe 58 is closed to the pipe 50 by the valve portion 55 and, as indicated, the pipe 34 is also closed to the pipe 50 by the closing of the needle valve 42 by the piston spring 48. Since the area of the needle valve end exposed to the pipe 50 is small compared with the area of the piston surface 47, and the spring 48 is relatively stiff, the needle valve 42 will not be unseated from its seat 44 by the air pressure supplied through the pipe 50 to actuate the brake 38. It will be understood that the actual pressure exerted by the spring 48 to close the needle valve 42 may be so adjusted, by actuation of the screw 43, that the air pressure required to unseat it would exceed that employed to operate the brake 38, whereas the area of the piston surface 47 would be such that the hydraulic fluid pressure, under the normal condition of operation, would be sufficient to unseat the needle valve.

In use, the operator will realize when the hydraulic pressure system has failed, by lack of "feel" at the brake pedal. He is then able to turn over to air pressure simply by adjustment of the valve 56. Having done this, of course, he no longer depends upon the actuation of the brake pedal and the brake valve outlet 32 would be closed. It must be taken into account that turning over to air operation of the brake is but an emergency measure and is merely relied upon to allow the pilot to make a landing, whereupon the hydraulic system would be reconditioned.

In practice, it is desirable to locate the valve 38 just as close to the brake as possible so that in the normal operation with the hydraulic fluid pressure the pressure transmitted back through the conduits 40, 50 and 58 will be substantially synchronized with the pressure developed in the brake 38, thus preventing the operator of the brake from obtaining a "feel" at the brake pedal out of phase with the actual operation of the brake.

Having thus described my invention, what I claim is new and desire to be covered by Letters Patent is:

1. In a brake actuator pressure supply system comprising a source of hydraulic pressure fluid, a brake valve controlling the flow of the hydraulic pressure fluid from said source to the brake actuator and a source of emergency air pressure for operating the brake actuator in case the hydraulic fluid pressure fails, said brake valve including a reaction chamber for imparting "feel" to the brake operator, conduit means interconnecting said brake valve reaction chamber, brake actuator and source of emergency air pressure, a control valve in said conduit means, between the brake actuator and said source of hydraulic fluid pressure, said control valve controlling the flow of the hydraulic pressure fluid from said brake valve to the brake actuator, and a selector valve interposed in said conduit means between the brake actuator and the said source of emergency air pressure and adjustable to connect said control valve and brake actuator back to said reaction chamber or to close the said connection back to the reaction chamber and open the emergency air pressure source to the brake actuator, said conduit means including a conduit portion common both to a back flow of the hydraulic fluid pressure to the said reaction chamber, and when said back flow is closed, to a flow of the emergency air pressure to the brake actuator.

2. A combined hydraulic fluid pressure and air emergency brake actuator system as claimed in claim 1, said control valve comprising a cylinder with a differential diameter piston defining a relatively large area chamber open to the hydraulic fluid pressure from the brake valve and a reduced end portion exposed to the flow of the reaction hydraulic fluid or the emergency air pressure along said common conduit portion and means constantly tending to position said piston in closed relation to a flow of the hydraulic pressure fluid between said large area chamber and said common conduit portion and the brake actuator.

3. In combination with a brake actuator having an actuating source of hydraulic fluid pressure, an alternative actuating source of emergency air pressure and a conduit system including said alternative pressure sources and brake actuator and a brake valve containing a reaction chamber for the hydraulic fluid pressure to give a load feel, the provision of a control valve in said conduit means between the outlet of said brake valve and the brake actuator and controlling the flow of the hydraulic fluid pressure to the latter and a two-position selector valve in said conduit means for connecting said brake actuator alternatively for actuation by the hydraulic fluid pressure or by the emergency air pressure, said control valve including a differential diameter piston exposed on its larger surface to the normal flow of the hydraulic fluid pressure from the brake valve to the brake actuator and on its smaller surface either to the reaction flow of the hydraulic fluid pressure from the brake actuator back to the said reaction chamber at the brake valve or to the emergency air pressure, and means tending to urge said piston to a closed position against the flow of the hydraulic fluid pressure from the brake valve to the brake actuator.

CHARLES HOLLERITH.

REFERENCES CITED

The following references are of record in the file of this patent:

UNITED STATES PATENTS

| Number | Name | Date |
|---|---|---|
| 2,133,275 | Andres | Oct. 15, 1938 |
| 2,394,343 | Vorech | Feb. 5, 1946 |